United States Patent
Song

(10) Patent No.: US 10,323,621 B2
(45) Date of Patent: Jun. 18, 2019

(54) WIND POWER GENERATION TOWER PROVIDED WITH GYROMILL TYPE WIND TURBINE

(71) Applicant: ODIN ENERGY CO., LTD., Seoul (KR)

(72) Inventor: Soo Yun Song, Seoul (KR)

(73) Assignee: ODIN ENERGY CO., LTD., Seoul (KR)

( * ) Notice: Subject to any disclaimer, the term of this patent is extended or adjusted under 35 U.S.C. 154(b) by 680 days.

(21) Appl. No.: 14/908,484

(22) PCT Filed: Dec. 30, 2013

(86) PCT No.: PCT/KR2013/012378
§ 371 (c)(1),
(2) Date: Jan. 28, 2016

(87) PCT Pub. No.: WO2015/016444
PCT Pub. Date: Feb. 5, 2015

(65) Prior Publication Data
US 2016/0186720 A1    Jun. 30, 2016

(30) Foreign Application Priority Data

Aug. 2, 2013   (KR) .................. 10-2013-0091877
Dec. 17, 2013  (KR) .................. 10-2013-0157070
(Continued)

(51) Int. Cl.
F03D 3/04       (2006.01)
F03D 3/00       (2006.01)
(Continued)

(52) U.S. Cl.
CPC ........... F03D 3/0427 (2013.01); F03D 3/005 (2013.01); F03D 3/061 (2013.01); F03D 9/25 (2016.05);
(Continued)

(58) Field of Classification Search
CPC ........ F03D 3/0409; F03D 3/0427; F03D 3/02; F03D 3/005; F03D 3/061; F03D 9/25;
(Continued)

(56) References Cited

U.S. PATENT DOCUMENTS 4,486,143 A * 12/1984 McVey ................. F03D 3/0427
                                                415/164
4,857,753 A *  8/1989 Mewburn-Crook .........
                                                F03D 3/0409
                                                290/55
(Continued)

FOREIGN PATENT DOCUMENTS

JP    5066648 B2    7/2012
JP    5172967 B2    3/2013
(Continued)

OTHER PUBLICATIONS

Howell, Robert et al., Wind tunnel and numerical study of a small vertical axis wind turbine, 2010, Renewable Energy, 35, 412-422.*
(Continued)

*Primary Examiner* — Jason D Shanske
*Assistant Examiner* — Joshua R Beebe

(57) ABSTRACT

The present invention discloses a wind power generation tower. The wind power generation tower, according to various embodiments of the present invention, comprises: a wind collection unit and an energy conversion unit, wherein wind power generation can be implemented by accelerating wind speed even for low speed wind and simultaneously increasing the utilization efficiency of the wind which
(Continued)

rotates blades, thereby improving overall power generation efficiency.

14 Claims, 5 Drawing Sheets

(30) Foreign Application Priority Data

Dec. 17, 2013 (KR) ........................ 10-2013-0157071
Dec. 17, 2013 (KR) ........................ 10-2013-0157075

(51) Int. Cl.
 *F03D 3/06* (2006.01)
 *H02K 7/18* (2006.01)
 *F03D 9/25* (2016.01)
 *F03D 13/20* (2016.01)

(52) U.S. Cl.
 CPC ............ *F03D 13/20* (2016.05); *H02K 7/183* (2013.01); *F05B 2240/912* (2013.01); *Y02E 10/728* (2013.01); *Y02E 10/74* (2013.01)

(58) Field of Classification Search
 CPC ....... F03D 13/20; Y02E 10/728; Y02E 10/74; F05B 2240/912; H02K 7/183
 See application file for complete search history.

(56) References Cited

U.S. PATENT DOCUMENTS

| | | | | |
|---|---|---|---|---|
| 2003/0209911 | A1* | 11/2003 | Pechler | ................. F03D 3/0427 |
| | | | | 290/55 |
| 2006/0275105 | A1* | 12/2006 | Roberts | ..................... F03D 3/02 |
| | | | | 415/4.2 |
| 2009/0100676 | A1* | 4/2009 | Yan | ......................... F03D 3/064 |
| | | | | 29/889 |
| 2010/0303618 | A1* | 12/2010 | Penn | ..................... F03D 3/0409 |
| | | | | 415/208.2 |
| 2010/0308597 | A1 | 12/2010 | Gyorgyi | |

FOREIGN PATENT DOCUMENTS

| | | |
|---|---|---|
| KR | 10-2010-0117240 A | 11/2010 |
| KR | 10-1059160 B1 | 8/2011 |
| WO | WO 2012/176048 A2 | 12/2012 |

OTHER PUBLICATIONS

Juhee Lee, et al., "Aerodynamic Characteristics of Giromill with High Solidity", Sep. 27, 2011, pp. 1273-1283, The Korean Society of Mechanical Engineers.
International Search Report for International Patent Application No. PCT/KR2013/012378 filed Dec. 30, 2013.

\* cited by examiner

WIND POWER GENERATION TOWER PROVIDED WITH GYROMILL TYPE WIND TURBINE

CROSS REFERENCE TO RELATED APPLICATIONS

The present application is a U.S. National Stage of International Patent Application No. PCT/KR2013/012378 filed Dec. 30, 2013, which claims priority to and the benefit of Korean Patent Application Nos. 10-2013-0091877, 10-2013-0157070, 10-2013-0157071, and 10-2013-0157075, filed in the Korean Intellectual Property Office on Aug. 2, 2013, Dec. 17, 2013, Dec 17, 2013, and Dec. 17, 2013, respectively, the entire contents of which are incorporated herein by reference.

TECHNICAL FIELD

The present invention relates to a wind power generation tower, and more particularly, to a wind power generation tower which is provided with a Gyromill type vertical axis wind turbine.

BACKGROUND ART

In general, a wind power generation system refers to a system that generates electric power by converting wind energy into mechanical energy using a technology of converting wind power into a rotation force to generate electric power, and driving a generator.

Wind power generation systems are generally classified into a horizontal axis wind power generation type and a vertical axis wind power generation type. The horizontal axis wind power generation is highly efficient but has a problem in that it is greatly influenced by a wind direction. The vertical wind power generation is not greatly influenced by a wind direction but has a problem in that its efficiency is not high as compared to horizontal axis wind power generation. Accordingly, most major companies in the wind power generation field have focused on the horizontal axis wind power generation, and have conducted considerable studies on a method for enhancing an efficiency of the vertical axis wind power generation. However, they have failed to find a proper method for enhancing the efficiency of the vertical axis wind power generation up to the present. Meanwhile, since the present invention is related to the vertical axis wind power generation, the following description will be made with reference to the vertical axis wind power generation.

The vertical axis wind power generation is technically advantageous in that wind entering into all directions may be used but has a problem in that it is difficult to perform wind power generation efficiently because wind entering from the air is generally irregular in direction and strength. Accordingly, in order to solve this problem, various methods for efficiently concentrating wind directions have been attempted. For example, it has been proposed to additionally install a wind collection tube structure having a guide wall around the vertical axis wind turbine such that wind may flow in a uniform direction and a wind speed may be increased.

Korean Patent Laid-Open Publication No. 2009-0035884 (Wind-Acceleration Type Wind Power Generator) discloses a technology in which a drag-type wind turbine is installed inside and a wind collection tube structure configured to be capable of making a wind direction uniform and increasing a wind speed is installed around the drag-type wind turbine so that the efficiency of a vertical axis wind turbine can be enhanced.

In addition, Japanese Patent Laid-Open Publication No. 2010-531594 (Wind Turbine Having Vertical Axis) discloses a technology in which a drag-type vertical axis wind turbine is provided inside a wind tower, and a wind collection tube structure configured to be capable of making a wind direction uniform and increasing a wind speed is installed around the drag-type vertical axis wind turbine.

However, since the wind collection tube disclosed in each of the above-described publications are designed such that wind guided into the wind collection tube is directly contacted with and rotates drag-type wind blades, it is difficult to maintain wind power generation continuously because the movement of the of the drag-type blades is changed depending on a change of the wind. In addition, the wind passing through the guide wall is adapted to directly come in contact with the drag-type blades, thereby generating considerable resistance. Therefore, such a configuration is advantageous in initial starting of the drag-type blades but has a problem in that when the wind speed is high, the wind rather acts as resistance, which hinders efficient wind power generation.

Accordingly, the inventors have developed a wind power generation tower provided with a vertical axis wind turbine configured to solve the technical problems as described above.

DISCLOSURE

Technical Problem

Exemplary embodiments of the present invention provide a technology related to a wind power generation tower provided with a Gyromill-type wind turbine formed to perform wind power generation even at a low wind speed and exhibit a maximum wind power generation efficiency.

Technical Solution

A wind power generation tower in accordance with an embodiment of the present invention includes: a wind collection section including wind inlets, into which wind enters, the inlets being formed in a plurality of tiers and each tier being configured to change a strength and direction of the wind; and an energy conversion section configured to convert energy of the wind while the wind passes therethrough. The wind collection section includes a plurality of wind guide walls disposed radially around the center of the wind power generation tower so that the wind flowing in through the wind inlets can flow in a radial direction of the energy conversion section. The energy conversion section includes therein a Gyromill-type wind turbine installed at a center of each tier of the wind power generation tower, the Gyromill-type wind turbine including Gyromill-type wind blades having a TSR in a range of 1.1 to 2.4, a solidity of 0.2 or more, and RPM of 240 or less. The energy conversion section may include wind flow paths formed in a space between the wind guide walls and the Gyromill-type wind blades, and inner flow paths formed in a space between the Gyromill-type wind blades at the center of the wind power generation tower.

The energy conversion section may be divided into four equal parts counterclockwise with reference to a direction perpendicular to a wind entering direction of the wind power generation tower to define the parts as first to fourth regions. The plurality of wind guide walls are formed to have an inclined angle that causes the winds passing through the wind collection section to flow to the outside through the first and fourth regions of the energy conversion section. As such, the number of the wind guide walls may be 5 to 9.

A distance of the wind flow paths may be determined such that a flow rate of wind flowing through the wind flow paths of the first and fourth regions of the energy conversion section is equal to or larger than a flow rate of wind flowing through the inner flow paths of the first and fourth flow regions.

Further, a minimum distance of the wind flow paths of the energy conversion section may extend to a position where a positive torque is initially generated in the fourth region, and a maximum distance of the wind flow paths may be a radius of the Gyromill-type wind turbines.

In addition, the angle of attack of the Gyromill type wind blades may be formed such that a positive torque is generated in the first and fourth regions of the energy conversion section. The wind power generation tower may also be formed in a cylindrical shape.

Advantageous Effects

A wind power generation tower provided with a Gyromill-type wind turbine according to an exemplary embodiment may implement wind power generation by accelerating a wind speed even if there is wind with a low speed and enhance an overall power generation efficiency by improving a use efficiency of wind that rotates the blades.

MODE FOR INVENTION

A wind power generation tower provided with a Gyromill-type wind turbine according to the present invention will be described in more detail below with reference to the accompanying drawings.

Figure 1:
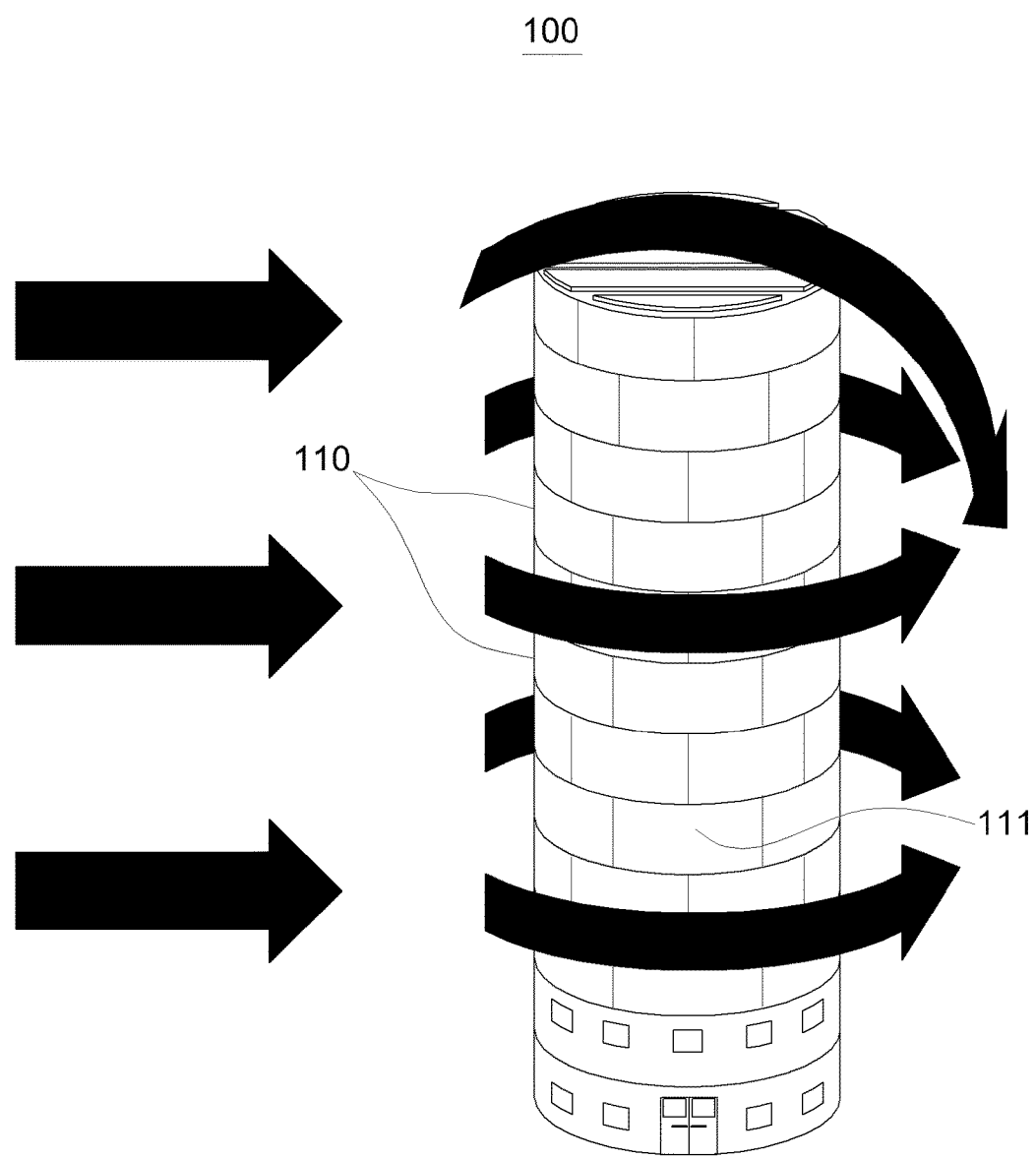
FIG. 1 is a view illustrating a wind power generation tower according to an exemplary embodiment of the present invention.

The inventors wish to propose a wind power generation tower in which wind collection sections configured to amplify a wind strength while performing a directional control of wind are formed in a plurality of tiers (or layers) as a measure for further amplifying the wind strength while concentrating directions of the wind in the atmosphere more effectively. A drawing related to this is illustrated in FIG. 1. As illustrated in the drawing, a wind power generation tower 100 according to the present invention may be manufactured by forming wind collection sections 110 in a plurality of tiers, in which each of the wind collection sections 110 includes a plurality of wind inlets 111 into which wind flow enters. Meanwhile, the wind entering into the wind power generation tower 100 passes through the wind inlets 111 of the wind power generation tower 100, or as illustrated in the drawing, flows along both side surfaces and a top portion of the wind power generation tower 100. For this, the wind power generation tower 100 may be formed in a cylindrical shape.

Figure 2:
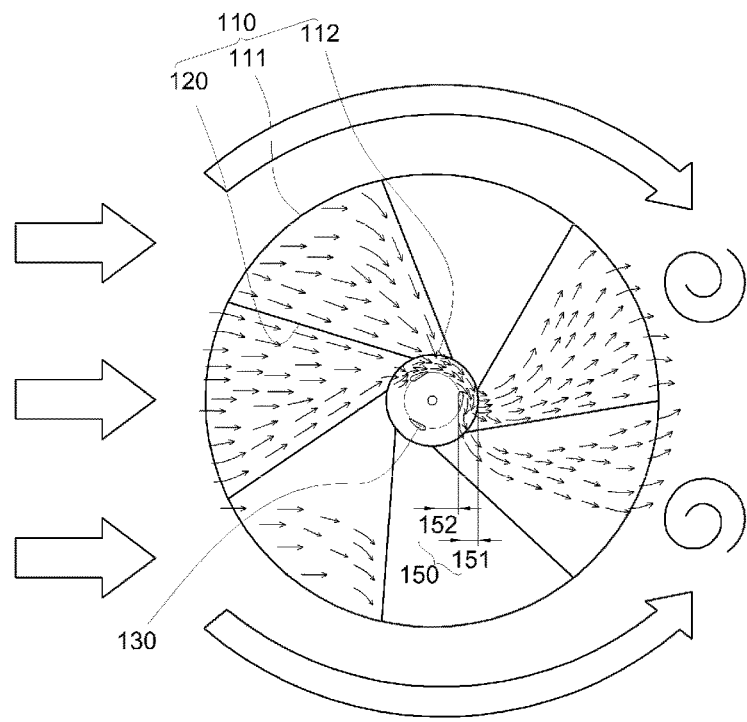
FIG. 2 is a cross-sectional view of the wind power generation tower illustrated in FIG. 1.

FIG. 2 illustrates a cross-section of one tier of the wind power generation tower 100 according to the present invention. Referring to the drawing, the wind power generation tower 100 according to the present invention may include a wind collection section 110 and an energy conversion section 150. The wind collection section 110 may be formed by disposing a plurality of wind guide walls 120 radially such that a difference exceeding a predetermined level in a cross-sectional area is provided between an wind inlet 111 and a wind outlet 112 in order to assure that the directions of wind entering from the outside may be controlled and the strength of the wind may be amplified as described above. Here, the difference in the cross-sectional area between the wind inlet 111 and the wind outlet 112 is formed to be a ratio of 2.5:1 or more so that an increase of wind speed may be obtained by the Venturi effect at a low wind speed of 5 m/s or less. In addition, the wind guide walls 120 may be preferably designed to provide a proper number of wind inlets 111 so that the wind entering into the wind power generation tower 100 may be effectively discharged to the outside. Accordingly, the wind power generation tower 100 according to the present invention is provided with 5 to 9 wind guide walls 110 so that the wind entering into the wind power generation tower 100 may be effectively discharged to the outside.

Figure 3:
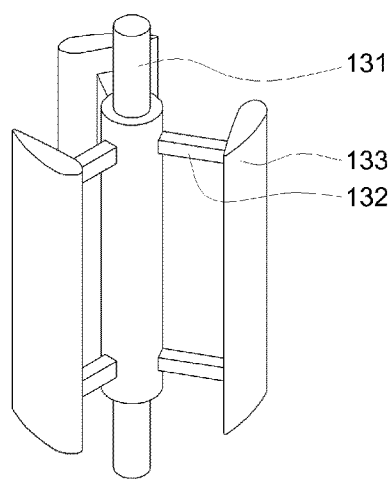
FIG. 3 is a view illustrating an exemplary embodiment of a Gyromill-type wind turbine installed in a wind power generation tower according to an exemplary embodiment of the present invention.

A vertical axis wind turbine is installed in an energy conversion section 150 formed at the center of each tier of the wind power generation tower 100, in which the present invention is characterized in that a Gyromill-type wind turbine 130 is installed as the vertical axis wind turbine. FIG. 3 illustrates an exemplary embodiment of the Gyromill-type wind turbine 130. The Gyromill-type wind turbine may include a central axis 131, Gyromill-type wind blades 133 each formed in a streamlined shape to be rotated by a lift force, and support shafts 132 connecting the central axis 131 and the Gyromill-type wind blade 133.

The energy conversion section 150 is a space where a wind energy is converted into a mechanical energy while the wind, which has passed through the wind collection section 110, passes through the space. With reference to the Gyromill-type wind blades 133 of the Gyromill-type wind turbine 130, the energy conversion section 150 may include a wind flow path 151 defined as a space between the Gyromill-type wind blades 133 and the ends of the wind guide walls 120, and an inner flow path 152 defined as a space between the central axis 131 of the Gyromill-type wind turbine 130 and the Gyromill-type wind blades 133.

Meanwhile, the wind power generation tower 100 according to an exemplary embodiment of the present invention is characterized in that a Gyromill-type wind turbine 130 is installed at the center of each tier, instead of an existing drag-type vertical axis wind turbine as described above. Most of wind power generation towers 100 which are provided with a wind collection section 110 and used in existing researches and practically operated are equipped with a drag-type vertical axis wind turbine at the center thereof. The drag-type vertical axis wind turbine is very advantageous at initial starting due to the fact that it is formed to directly contact with the wind entering into the turbine. However, as described above, the rotation of the turbine is directly affected by a change of the wind, and as a result, it is difficult to perform power generation continuously. In addition, when the wind speed entering into the turbine is very fast, high friction between the wind and the drag-type blades rather makes it difficult to perform effective power generation.

Accordingly, the inventors wish to solve the problems as described above by installing the Gyromill-type wind turbine 130 at the center of the wind power generation tower 100 according to the present invention as illustrated in FIGS. 2 and 3, instead of the existing drag-type vertical axis wind turbine. The Gyromill-type wind turbine 130 is configured to be rotated using mainly a lift force because each of the Gyromill-type wind blades 133 is formed in a streamlined shape. It is also characterized in that a wing with a finite length is formed in a straight line shape.

Meanwhile, the Gyromill-type wind turbine 130 is technically similar to a Darrieus wind turbine in that it is driven by a lift force. However, the Gyromill-type wind turbine 130 has a high solidity and a low TSR (Tip Speed Ratio) as compared to the Darrieus wind turbine since the Gyromill-type wind blades 133 are formed to have a finite length in a streamlined shape. Here, the solidity refers to a ratio of a length occupied by a blade in relation to a radius of rotation of the blade at any predetermined radial position, and the TSR refers a ratio of a wind speed and a blade tip speed. That is, when the wind speed and the blade tip speed are equal to each other, the TSR becomes 1.

Meanwhile, since the Gyromill-type wind turbine 130 has a considerably high solidity unlike the Darrieus wind turbine, there is a problem in that as the TSR increases, a lift force considerably decreases due to the interference between the Gyromill-type wind blades 133 and a decrease of flow speed of wind entering into a blade positioned at the downstream side. Accordingly, in order to minimize the technical problem as described above, the Gyromill-type wind turbine 130 installed in the wind power generation tower 100 according to the present invention is configured to have a solidity of at least 0.2 and a TSR in a range of 1.1 to 2.4. In addition, since the Gyromill-type wind turbine 130 generates a stall when the TSR exceeds 2.5, the Gyromill-type wind turbine 130 is configured not to exceed 2.4. In addition, the Gyromill-type wind blades 133 have a problem in that when the speed (rpm) is too high, surrounding air is accelerated by the rotating speed of the blades, increasing drag, which causes degradation of the performance of the Gyromill-type wind turbine 130. Accordingly, in order to avoid this problem, the Gyromill-type wind turbine 130 is configured to be operated at an rpm of 240 or less.

Figure 4:
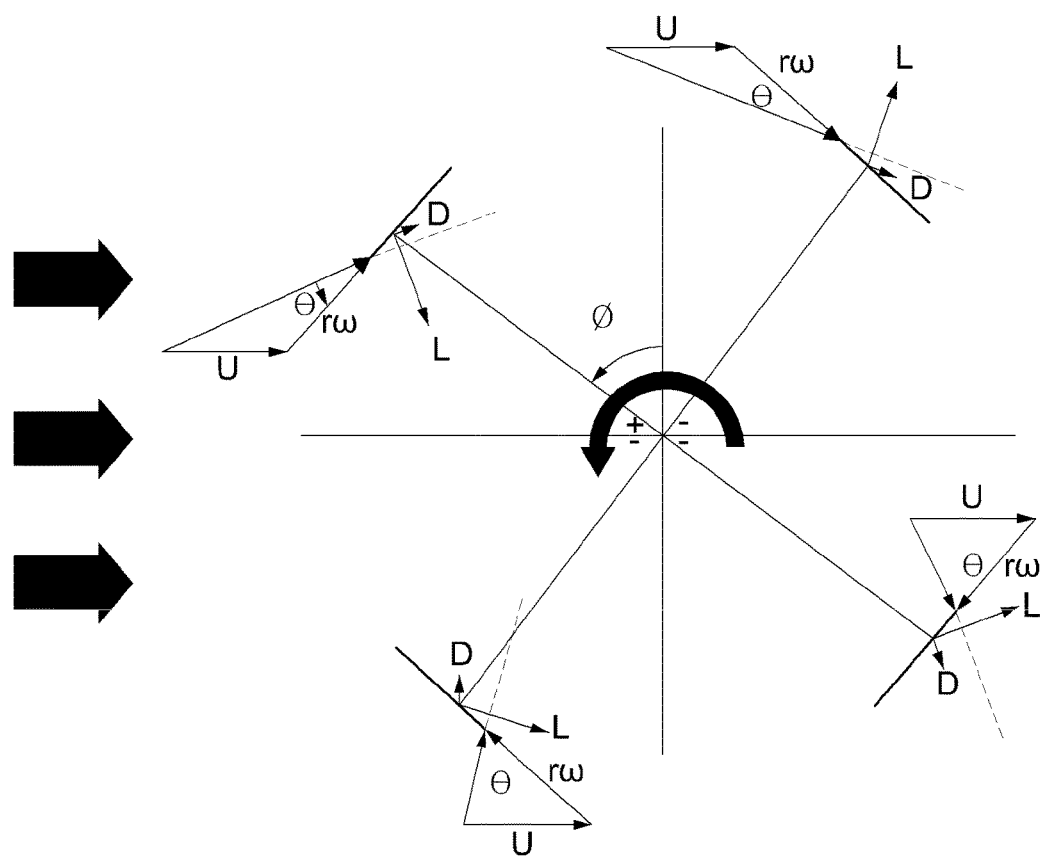
FIG. 4 is a view illustrating lift forces and drags acting on blades according to an azimuth of a Gyromill-type wind turbine.

In connection with the movement of the blades of the Gyromill-type wind turbine 130 applied to the wind power generation tower 100 according to the exemplary embodiment of the present invention, a research regarding the driving of the Gyromill-type wind turbine 130 is disclosed in "*Aerodynamic Characteristics of Gyromill with High Solidity*" (Juhee Lee and Young So Yoo, Journal B of Korean Society of Mechanical Engineering, 2011, Vol. 35, No. 12, pp. 1273-1283, 2011). The contents related to the research are illustrated in FIG. 4. Referring to FIG. 4, when, with reference to a wind entering direction, a first region and a second region are defined as an upstream side of the flow and a third region and a fourth region are defined as a downstream side, it can be seen that in the first and second regions of the upstream side of the flow, a lift force generated in the Gyromill-type wind blades 133 is larger than a drag so that the rotation of the Gyromill-type wind blades 133 can be performed while, in the third and fourth regions, the drag is larger than the lift force, so a force is applied to hinder the rotation of the Gyromill-type wind blades 133. Due to the drag generated in the third and fourth regions, the efficiency of the ordinary Gyromill wind turbine 130 deteriorates.

Figure 5:
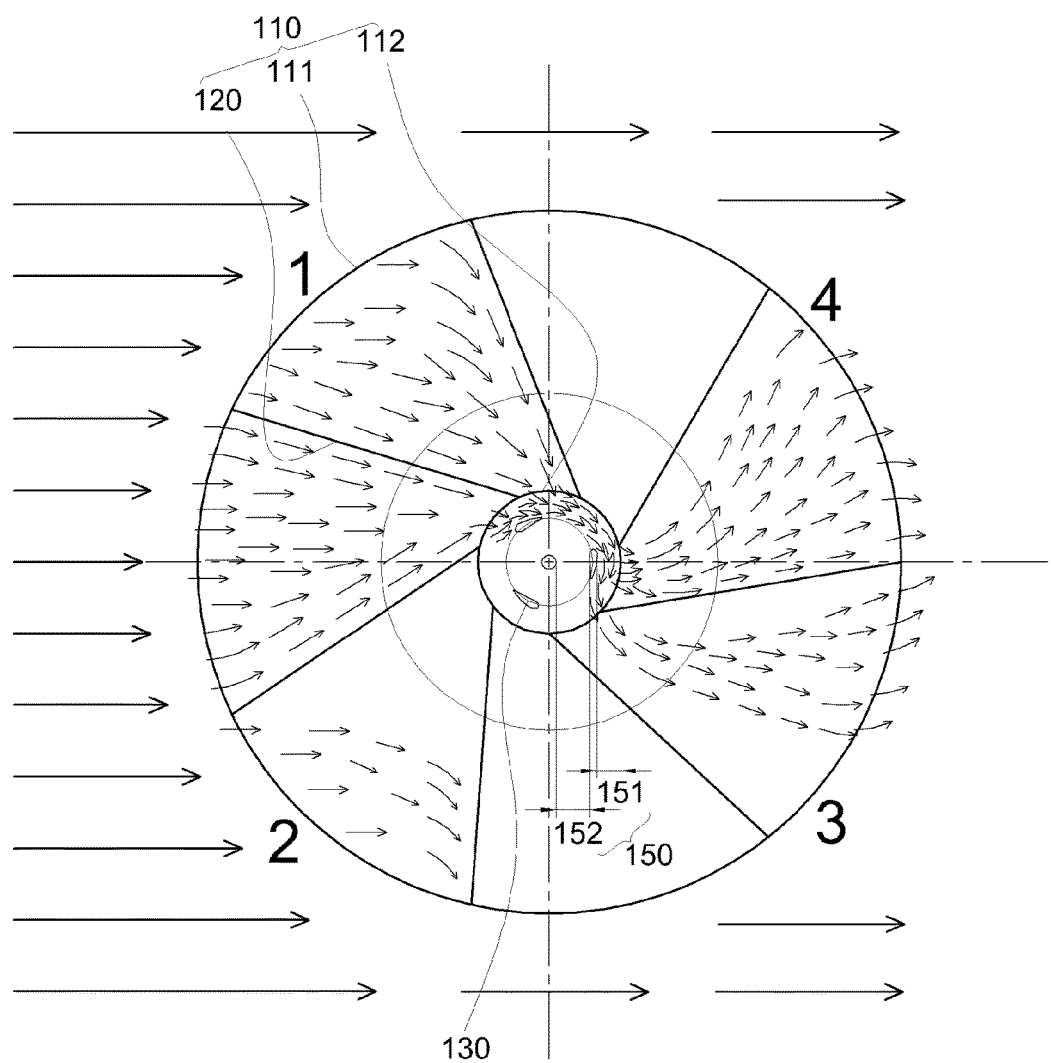
FIG. 5 is a cross-sectional view illustrating a cross-sectional view of a wind power generation tower according to an exemplary embodiment of the present invention.
Figure 6:
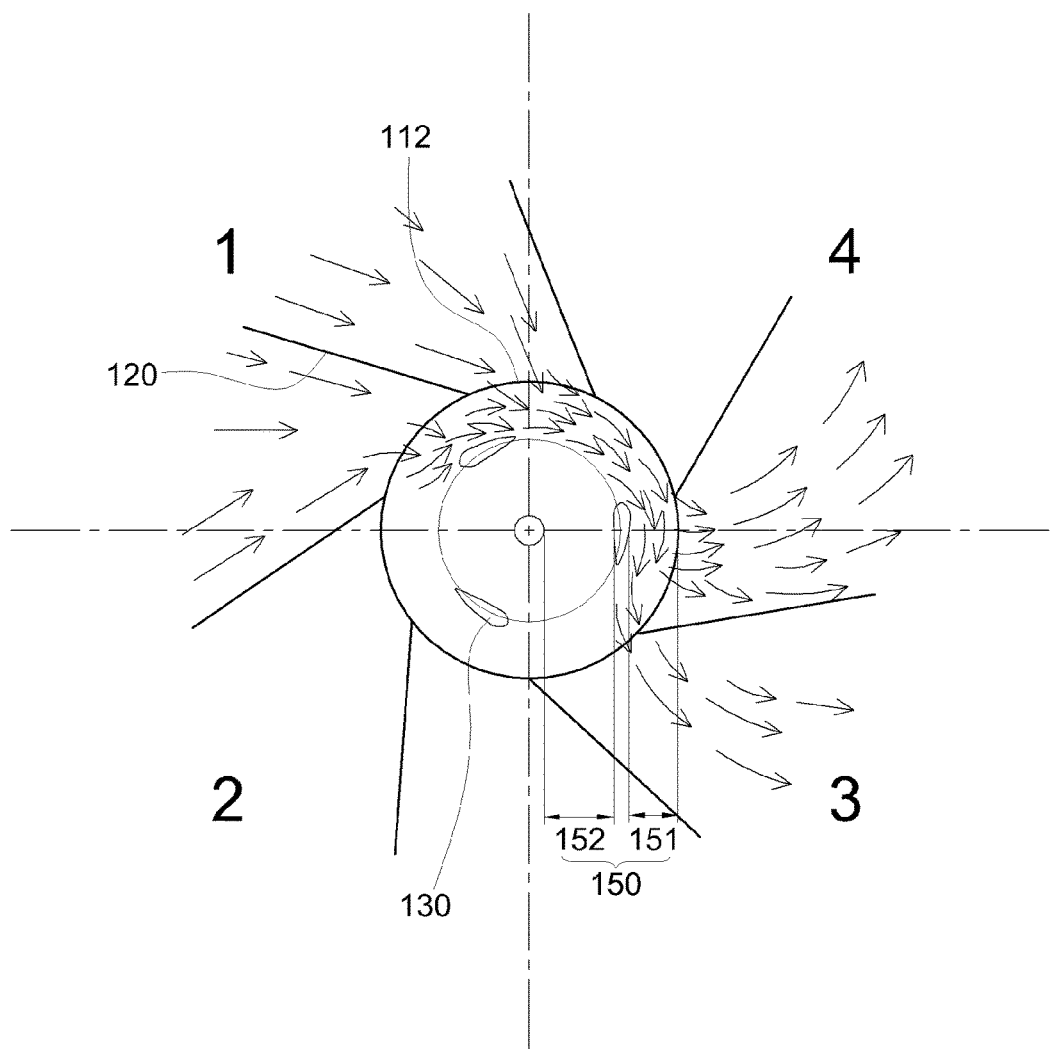
FIG. 6 is an enlarged view illustrating a wind collection section and an energy conversion section illustrated in FIG. 5.

Accordingly, the inventors have improved the configuration of the wind power generation tower 100 to overcome the technical disadvantages of the Gyromill wind turbine 130 as much as possible while utilizing the technical advantages thereof. More specifically, as illustrated in FIGS. 5 and 6, a plurality of wind guide walls 120 are installed to be inclined at the same angle around the center of the center of the wind power generation tower 100 so that the wind entering through the wind inlet 111 may flow in the radial direction of the energy conversion section 150. Through this, as illustrated in the drawings, after passing through the wind collection section 110, the wind flows along the first and fourth regions of the energy conversion section 150. In addition, it is important to design the energy conversion section 150 of the wind power generation tower 100 of the exemplary embodiment of the present invention to have sufficient wind flow paths 151 so as to ensure smooth rotation of the Gyromill-type wind blades 133. Meanwhile, the above-described exemplary embodiment has been described assuming that the Gyromill-type wind blades 133 are rotated counterclockwise with reference to the wind entering direction as an example. However, when the Gyromill-type wind blades 133 are rotated clockwise with reference to the wind entering direction, the wind guide walls 120 may be formed such that after passing through the wind collection section 110, the wind flows along the second region and third region of the energy conversion section 150.

Since the Gyromill-type wind blades 133 are rotated by a lift force unlike an existing drag-type vertical axis turbine, spaces are required to allow wind to sufficiently flow at the front and rear ends of the Gyromill-type wind blades 133. Accordingly, in the present invention, the energy conversion section 150 is technically characterized in that it is designed such that the spaces formed between the central axis 131 of the Gyromill-type wind turbine 130 and the Gyromill-type wind blades 133 are defined as inner flow paths 152, and the spaces between the Gyromill-type wind blades 133 and the wind guide walls 120 of the wind collection section 110 are defined as wind flow paths 151, and the spaces which allow the wind to sufficiently flow may be provided by the wind flow paths 151.

The above-described configuration is illustrated in FIGS. 5 and 6. According to these drawings, the wind passing through the wind collection section 110 is guided to flow along the wind flow paths 151 and the inner flow paths 152 formed in the first and fourth regions of the energy conversion section 150. Accordingly, the Gyromill-type wind turbine 130 installed in the wind power generation tower 100 according to the present invention is rotated by the lift force generated in the first and fourth regions, unlike the existing turbine which is rotated by the lift force generated in the first and second regions. In addition, the energy conversion section 150 of the wind power generation tower 100 according to the present invention may minimize the effect of reducing the speed of the blades due to the drag generated at the downstream side of the flow of the wind since the flow of the wind is scarcely generated in the second and third regions. Meanwhile, when the Gyromill-type wind turbine 130 is rotated in the opposite direction, the wind passing through the wind collection section 110 may flow along the wind flow paths 151 and the inner flow paths 152 which are formed in the second and third regions of the energy conversion section 150.

In addition, in the wind power generation tower 100 according to the present invention, it is more important than anything to set a suitable distance for the wind flow paths 151 so as to efficiently enhance the rotation efficiency of the Gyromill-type wind turbine 130 installed in the energy conversion section 150. In particular, when the wind power generation tower 100 according to the present invention is divided into first to fourth regions in the counterclockwise direction with reference to the wind entering direction, it is necessary to set the distance of the wind flow paths 151 such that a lift force is generated in the first and fourth regions. In order to achieve such a technical object, the wind power generation tower 100 according to the present invention is configured such that the flow rates of the wind flowing along the wind flow paths 151 and the inner flow paths 152 of the first and second regions are at least equal to each other or the flow rate of the wind flowing along the wind flow paths 151 is larger than the flow rate of the wind flowing along the inner flow paths 152. Besides the above-described methods, the technical object as described above may be somewhat achieved by adjusting the inclination of the wind guide walls 120 to adjust the flow rate flowing in the wind flow paths 151 or by adjusting the angle of attack where the wind flowing along the energy conversion section 150 comes in contact with the Gyromill-type wind blades 133 to generate a lift force. However, this is caused by a detailed change and the main technical characteristic of the present invention can be achieved by properly adjusting the distance of the wind flow paths 151 to increase the flow rate of the wind flowing through the wind flow path 151 such that the lift force is generated on the Gyromill-type wind blades 133 in the first and fourth regions of the energy conversion section 150.

In addition, the minimum distance of the wind flow paths 151 formed in the energy conversion section 150 of the wind power generation tower 100 of the present invention is determined to extend to a position where a positive torque is initially generated on the Gyromill-type wind blades 133 in the fourth region of the energy conversion section 150 and the maximum distance is determined not to exceed the radius of the Gyromill-type wind turbine 130. That is, since the wind power generation tower 100 according to the present invention has an efficiency which is increased depending on how much positive torque is generated in the fourth region of the energy conversion section 150, the minimum distance of the wind flow paths 151 may be determined to extend to a position where the positive torque is initially generated in the fourth region of the energy conversion section 150.

As described above, the wind power generation tower 100 provided with the Gyromill-type wind turbine according to the present invention enables higher efficiency vertical axis wind power generation through the structural improvement of the wind collection section 110 and the energy conversion section 150 by installing the Gyromill-type wind turbine 130 therein.

Meanwhile, the wind flow paths 151 formed in the energy conversion section 150 of the wind power generation tower 100 according to the present invention are necessarily needed not only for the purpose of forming the flow of wind for smoothly generating a lift force on the wind blades 133 of the Gyromill-type wind turbine 130 as described above, but also for additionally increasing the wind within the energy conversion section 150 of the wind power generation tower 100 through the flow of the wind generated in the wind power generation tower 100. FIG. 1 illustrates the flow of wind flowing in the wind power generation tower 100 according to the present invention as an example. The wind flowing in the wind power generation tower 100 also includes wind flowing along both sides and a top side of the wind power generation tower 100, in addition to the wind flowing through the inside of the wind power generation tower 100 through the wind inlet 111 and the wind collection section 110. In this case, as illustrated in FIG. 2, a swirling flow is generated in the direction opposite to the wind entering direction of the wind power generation tower 100, thereby considerably lowering the pressure. Accordingly, the wind discharged through the inside of the wind power generation tower 100 is accelerated due to the pressure difference by the swirling flow.

More specifically, the wind passing through the wind flow path 151 within the energy conversion section 150 and discharged from the opposite side of the wind power generation tower 100 is subjected to a considerable pressure difference produced in the wind discharge space at the opposite side of the wind power generation tower 100 by the swirling flow formed in the wind discharge space at the opposite side of the wind power generation tower 100. As a result, the strength of the wind passing through the wind flow paths 151 of the energy conversion section 150 may be further increased. Accordingly, the wind flowing along the wind flow paths 151 of the energy conversion section 150 is accelerated by the pressure difference as described above, and also considerably influences the rotating force of the Gyromill-type wind blades 133 formed in the energy conversion section 150.

Accordingly, in order to obtain the efficiency improving effect of the vertical axis wind turbine installed within the energy conversion section 150 by the swirling flow generated by the wind flowing in the wind power generation tower 100 as described above, the wind flow paths 151 shall be necessarily installed within the energy conversion section 150. Unless the wind flow paths 151 are properly provided in the energy conversion section 150, the effect of increasing the strength of the wind flowing in the energy conversion section 150 by the pressure difference generated by the flow of the wind flowing in the wind power generation tower 100 as described above will not directly influence the rotating force of the vertical axis wind turbine installed within the energy conversion section 150.

Accordingly, as described above, the wind flow paths 151 formed within the energy conversion section 150 of the wind power generation tower 100 of the present invention makes it possible to smoothly obtain a rotating force of the Gyromill-type wind turbine 130 and to obtain a wind acceleration effect by the swirling flow generated by the wind flowing along the wind power generation tower 100.

The wind power generation tower 100 according to the present invention includes a Gyromill-type wind turbine 130 which is a vertical axis wind turbine and is installed therein. According to the present invention, it may be confirmed that the efficiency is improved by about 50% or more as compared to a case in which an existing vertical axis wind turbine is rotated from a standby state. This may be obtained by increasing the flow rate and strength of wind flowing through the energy conversion section 150 in a predetermined direction through the configuration of the wind collection section 110 and the energy conversion section 150, together with the increase of the strength of the Venturi effect in the wind collection section 110, so that the energy applied to the Gyromill-type wind turbine 130 can be increased. In addition, the effects as described above can be obtained by accelerating the wind within the energy conversion section 150 in two steps by the pressure difference produced by a swirling generated by the flow of the wind generated along the wind power generation tower 100 itself.

In the foregoing, although the exemplary embodiments have been described, a person ordinarily skilled in the related art may variously modify and change the present invention without departing from the spirit of the present invention defined in the claims by modifying, changing, removing or adding constituent elements, and the modifications and changes belong to the scope of the present invention.

The invention claimed is:

1. A wind power generation tower comprising:
   a wind collection section including wind inlets, into which wind enters, the inlets being formed in a plurality of tiers and each tier being configured to change a strength and direction of the wind; and
   an energy conversion section configured to convert energy of the wind while the wind passes therethrough,
   wherein the wind collection section includes a plurality of inclined wind guide walls disposed radially around the center of the wind power generation tower so that the wind flowing in through the wind inlets can flow along the energy conversion section in a direction opposite to a rotating direction of the turbine,
   the wind turbine includes therein a Gyromill-type wind turbine installed at an inner center of the energy conversion section of each tier of the wind power generation tower, the Gyromill-type wind turbine including Gyromill-type wind blades having a tip speed ratio (TSR) in a range of 1.1 to 2.4, a solidity of 0.2 or more, and RPM of 240 or less, and
   the wind turbine includes wind flow paths formed in a space between the wind guide walls and the Gyromill-type wind blades, and inner flow paths formed in a space between the Gyromill-type wind blades at the center of the wind power generation tower, and
   wherein the wind collection section includes wind outlets defined by inner ends of the wind guide walls that convey wind from the wind collection section to the energy conversion section, and a ratio of cross-sectional areas of the wind outlets to the wind inlets is 2.5:1 or greater.

2. The wind power generation tower as claimed in claim 1,
   wherein the energy conversion section is divided into four equal parts with reference to a direction perpendicular to a wind blowing-in direction of the wind power generation tower to define the parts as first to fourth regions, and
   the wind power generation tower is configured so that when the Gyromill-type wind blades are rotating in a counterclockwise direction, the wind introduced inside the energy conversion section passes through the first and fourth regions of the energy conversion section and then flows outside the wind power generation tower at a side opposite to a side in which the wind enters the wind power generation tower.

3. The wind power generation tower as claimed in claim 2, wherein a distance of the wind flow paths is determined such that a flow rate of wind flowing through the wind flow paths of the first and fourth regions of the energy conversion section is equal to or larger than a flow rate of wind flowing through the inner flow paths of the first and fourth flow regions.

4. The wind power generation tower as claimed in claim 3, wherein a minimum distance of the wind flow paths of the energy conversion section extends to a position where a positive torque is initially generated in the fourth region, and a maximum distance of the wind flow paths is a radius of the Gyromill-type wind turbines.

5. The wind power generation tower as claimed in claim 2, wherein a minimum distance of the wind flow paths of the energy conversion section extends to a position where a positive torque is initially generated in the fourth region, and a maximum distance of the wind flow paths is a radius of the Gyromill-type wind turbines.

6. The wind power generation tower as claimed in claim 2, wherein the angle of attack of the Gyromill type wind blades is formed such that a positive torque is generated in the first and fourth regions of the energy conversion section.

7. The wind power generation tower as claimed in claim 1, wherein the number of the wind guide walls is 5 to 9.

8. The wind power generation tower as claimed in claim 1, wherein the wind power generation tower is formed in a cylindrical shape.

9. A wind power generation tower comprising:
   a wind collection section including wind inlets, into which wind enters, the inlets being formed in a plurality of tiers and each tier being configured to change a strength and direction of the wind; and
   an energy conversion section configured to convert energy of the wind while the wind passes therethrough,
   wherein the wind collection section includes a plurality of inclined wind guide walls disposed radially around the center of the wind power generation tower so that the wind flowing in through the wind inlets can flow along the energy conversion section in a direction opposite to a rotating direction of the turbine,
   the wind turbine includes therein a Gyromill-type wind turbine installed at an inner center of the energy conversion section of each tier of the wind power generation tower, the Gyromill-type wind turbine including Gyromill-type wind blades having a tip speed ratio (TSR) in a range of 1.1 to 2.4, a solidity of 0.2 or more, and RPM of 240 or less,
   the wind turbine includes wind flow paths formed in a space between the wind guide walls and the Gyromill-type wind blades, and inner flow paths formed in a space between the Gyromill-type wind blades at the center of the wind power generation tower, the energy conversion section being divided into four equal parts counterclockwise with reference to a direction perpendicular to a wind entering direction of the wind power generation tower to define the parts as first to fourth regions, and
   when the Gyromill-type wind blades are rotated counterclockwise, a distance of the wind flow paths is determined such that a flow rate of wind flowing through the wind flow paths of the first and fourth regions of the energy conversion section is equal to or larger than a flow rate of wind flowing through the inner flow paths of the first and fourth flow regions, and
   wherein the wind collection section includes wind outlets defined by inner ends of the wind guide walls that convey wind from the wind collection section to the energy conversion section, and a ratio of cross-sectional areas of the wind outlets to the wind inlets is 2.5:1 or greater.

10. A wind power generation tower comprising:
    a wind collection section including wind inlets, into which wind enters, the inlets being formed in a plurality of tiers and each tier being configured to change a strength and direction of the wind; and an energy conversion section configured to convert energy of the wind while the wind passes therethrough, wherein the wind collection section includes a plurality of inclined wind guide walls disposed radially around the center of the wind power generation tower so that the wind flowing in through the wind inlets can flow along the energy conversion section in a direction opposite to a rotating direction of the turbine, the wind turbine includes therein a Gyromill-type wind turbine installed at an inner center of the energy conversion section of each tier of the wind power generation tower, the Gyromill-type wind turbine including Gyromill-type wind blades having a tip speed ratio (TSR) in a range of 1.1 to 2.4, a solidity of 0.2 or more, and RPM of 240 or less, the wind turbine includes wind flow paths formed in a space between the wind guide walls and the Gyromill-type wind blades, and inner flow paths formed in a space between the Gyromill-type wind blades at the center of the wind power generation tower, the energy conversion section being divided into four equal parts counterclockwise with reference to a direction perpendicular to a wind entering direction of the wind power generation tower to define the parts as first to fourth regions, and when the Gyromill-type wind blades are rotated clockwise, a distance of the wind flow paths is determined such that a flow rate of wind flowing through the wind flow paths of the second and third regions of the energy conversion section is equal to or larger than a flow rate of wind flowing through the inner flow paths of the second and third flow regions, and wherein the wind collection section includes wind outlets defined by inner ends of the wind guide walls that convey wind from the wind collection section to the energy conversion section, and a ratio of cross-sectional areas of the wind outlets to the wind inlets is 2.5:1 or greater.

11. A wind power generation tower comprising:
a wind collection section including wind inlets, into which wind enters, the inlets being formed in a plurality of tiers and each tier being configured to change a strength and direction of the wind; and an energy conversion section configured to convert energy of the wind while the wind passes therethrough, wherein the wind collection section includes a plurality of inclined wind guide walls disposed radially around the center of the wind power generation tower so that the wind flowing in through the wind inlets can flow along the energy conversion section in a direction opposite to a rotating direction of the turbine, the wind turbine includes therein a Gyromill-type wind turbine installed at an inner center of the energy conversion section of each tier of the wind power generation tower, the Gyromill-type wind turbine including Gyromill-type wind blades having a tip speed ratio (TSR) in a range of 1.1 to 2.4, a solidity of 0.2 or more, and RPM of 240 or less, the wind turbine includes wind flow paths formed in a space between the wind guide walls and the Gyromill-type wind blades, and inner flow paths formed in a space between the Gyromill-type wind blades at the center of the wind power generation tower, the energy conversion section being divided into four equal parts counterclockwise with reference to a direction perpendicular to a wind entering direction of the wind power generation tower to define the parts as first to fourth regions, and when the Gyromill-type wind blades are rotated counterclockwise, a minimum distance of the wind flow paths of the energy conversion section extends to a position where a positive torque is initially generated in the fourth region, and a maximum distance of the wind flow paths is a radius of the Gyromill-type wind turbines, and wherein the wind collection section includes wind outlets defined by inner ends of the wind guide walls that convey wind from the wind collection section to the energy conversion section, and a ratio of cross-sectional areas of the wind outlets to the wind inlets is 2.5:1 or greater.

12. A wind power generation tower comprising:
a wind collection section including wind inlets, into which wind enters, the inlets being formed in a plurality of tiers and each tier being configured to change a strength and direction of the wind; and an energy conversion section configured to convert energy of the wind while the wind passes therethrough, wherein the wind collection section includes a plurality of inclined wind guide walls disposed radially around the center of the wind power generation tower so that the wind flowing in through the wind inlets can flow along the energy conversion section in a direction opposite to a rotating direction of the turbine, the wind turbine includes therein a Gyromill-type wind turbine installed at an inner center of the energy conversion section of each tier of the wind power generation tower, the Gyromill-type wind turbine including Gyromill-type wind blades having a tip speed ratio (TSR) in a range of 1.1 to 2.4, a solidity of 0.2 or more, and RPM of 240 or less, the wind turbine includes wind flow paths formed in a space between the wind guide walls and the Gyromill-type wind blades, and inner flow paths formed in a space between the Gyromill-type wind blades at the center of the wind power generation tower, the energy conversion section being divided into four equal parts counterclockwise with reference to a direction perpendicular to a wind entering direction of the wind power generation tower to define the parts as first to fourth regions, and when the Gyromill-type wind blades are rotated clockwise, a minimum distance of the wind flow paths of the energy conversion section extends to a position where a positive torque is initially generated in the third region, and a maximum distance of the wind flow paths is a radius of the Gyromill-type wind turbines, and wherein the wind collection section includes wind outlets defined by inner ends of the wind guide walls that convey wind from the wind collection section to the energy conversion section, and a ratio of cross-sectional areas of the wind outlets to the wind inlets is 2.5:1 or greater.

13. A wind power generation tower comprising:
a wind collection section including wind inlets, into which wind enters, the inlets being formed in a plurality of tiers and each tier being configured to change a strength and direction of the wind; and an energy conversion section configured to convert energy of the wind while the wind passes therethrough, wherein the wind collection section includes a plurality of inclined wind guide walls disposed radially around the center of the wind power generation tower so that the wind flowing in through the wind inlets can flow along the energy conversion section in a direction opposite to a rotating direction of the turbine, the wind turbine includes therein a Gyromill-type wind turbine installed at an inner center of the energy conversion section of each tier of the wind power generation tower, the Gyromill-type wind turbine including Gyromill-type wind blades having a tip speed ratio (TSR) in a range of 1.1 to 2.4, a solidity of 0.2 or more, and RPM of 240 or less, the wind turbine includes wind flow paths formed in a space between the wind guide walls and the Gyromill-type wind blades, and inner flow paths formed in a space between the Gyromill-type wind blades at the center of the wind power generation tower, the energy conversion section being divided into four equal parts counterclockwise with reference to a direction perpendicular to a wind entering direction of the wind power generation tower to define the parts as first to fourth regions, and when the Gyromill-type wind blades are rotated counterclockwise, an angle of attack of the Gyromill type wind blades is formed so that a positive torque is generated in the first and fourth regions, and wherein the wind collection section includes wind outlets defined by inner ends of the wind guide walls that convey wind from the wind collection section to the energy conversion section, and a ratio of cross-sectional areas of the wind outlets to the wind inlets is 2.5:1 or greater.

14. A wind power generation tower comprising:

a wind collection section including wind inlets, into which wind enters, the inlets being formed in a plurality of tiers and each tier being configured to change a strength and direction of the wind; and an energy conversion section configured to convert energy of the wind while the wind passes therethrough, wherein the wind collection section includes a plurality of inclined wind guide walls disposed radially around the center of the wind power generation tower so that the wind flowing in through the wind inlets can flow along the energy conversion section in a direction opposite to a rotating direction of the turbine, the wind turbine includes therein a Gyromill-type wind turbine installed at an inner center of the energy conversion section of each tier of the wind power generation tower, the Gyromill-type wind turbine including Gyromill-type wind blades having a tip speed ratio (TSR) in a range of 1.1 to 2.4, a solidity of 0.2 or more, and RPM of 240 or less, the wind turbine includes wind flow paths formed in a space between the wind guide walls and the Gyromill-type wind blades, and inner flow paths formed in a space between the Gyromill-type wind blades at the center of the wind power generation tower, the energy conversion section being divided into four equal parts counterclockwise with reference to a direction perpendicular to a wind entering direction of the wind power generation tower to define the parts as first to fourth regions, and when the Gyromill-type wind blades are rotated clockwise, an angle of attack of the Gyromill type wind blades is formed so that a positive torque is generated in the second and third regions, and wherein the wind collection section includes wind outlets defined by inner ends of the wind guide walls that convey wind from the wind collection section to the energy conversion section, and a ratio of cross-sectional areas of the wind outlets to the wind inlets is 2.5:1 or greater.

* * * * *